US008649120B1

United States Patent
Song et al.

(10) Patent No.: US 8,649,120 B1
(45) Date of Patent: *Feb. 11, 2014

(54) SYSTEMS AND METHODS FOR GAIN COMPENSATION AND RE-TIMING IN MAGNETIC RECORDING CHANNELS

(75) Inventors: Hongxin Song, Sunnyvale, CA (US); Michael Madden, Mountain View, CA (US); Gregory Burd, San Jose, CA (US); Nitin Nangare, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 51 days.

This patent is subject to a terminal disclaimer.

(21) Appl. No.: 13/365,658

(22) Filed: Feb. 3, 2012

Related U.S. Application Data

(60) Provisional application No. 61/439,787, filed on Feb. 4, 2011, provisional application No. 61/439,795, filed on Feb. 4, 2011, provisional application No. 61/439,792, filed on Feb. 4, 2011.

(51) Int. Cl.
*G11B 5/09* (2006.01)
*G11B 5/035* (2006.01)

(52) U.S. Cl.
USPC .................... 360/39; 360/46; 360/65

(58) Field of Classification Search
USPC ........... 360/55, 45, 69, 75, 33, 39, 46, 65, 68, 360/77.02, 78.04, 78.09; 375/316, 222, 233
See application file for complete search history.

(56) References Cited

U.S. PATENT DOCUMENTS 8,300,339 B1 * 10/2012 Nangare et al. ................. 360/39
8,441,750 B1 * 5/2013 Nangare et al. ................. 360/39

OTHER PUBLICATIONS

Bergmans, J.W.M., "Digital Baseband Transmission and Recording", Kluwer Academic Publishers n.k.a. Springer Science+Business Media, 1996; Abstract.
Mueller, Kurt H. and Müller, Markus, "Timing Recovery In Digital Synchronous", IEEE Transactions on Communications, vol. COM-24, No. 5 May 1976; pp. 516-31.

* cited by examiner

*Primary Examiner* — Ali Neyzari

(57) ABSTRACT

A receiver for a hard disk drive system includes an analog front end module configured to receive a read-back signal and to output a digital read-back signal. An equalizer module is configured to generate a data vector based on the digital read-back signal. A detector module is configured to generate a decision vector based on the data vector. A gain module is configured to generate a scalar gain vector and to generate a revised data vector based on the data vector, the decision vector and the scalar gain vector. A back end module is configured to receive the revised data vector.

20 Claims, 15 Drawing Sheets

SYSTEMS AND METHODS FOR GAIN COMPENSATION AND RE-TIMING IN MAGNETIC RECORDING CHANNELS

CROSS-REFERENCE TO RELATED APPLICATIONS

This application claims the benefit of U.S. Provisional Application Nos. 61/439,787, filed on Feb. 4, 2011, 61/439,792, filed on Feb. 4, 2011, and 61/439,795, filed on Feb. 4, 2011. The disclosures of the above applications are incorporated herein by reference in their entirety.

FIELD

The present disclosure relates to magnetic recording systems, and more particularly to gain and timing compensation in receivers of magnetic recording systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a hard disk drive (HDD) system is shown. The HDD system 10 includes a hard disk assembly (HDA) 12 and a HDD printed circuit board (PCB) 14. The HDA 12 includes one or more circular platters (i.e. disks) 16, which have magnetic surfaces that are used to store data magnetically. The disks 16 are arranged in a stack, and the stack is rotated by a spindle motor 18. At least one read and write head (hereinafter, "head") 20 reads data from and writes data on the magnetic surfaces of the disks 16.

The head 20 includes a write head, such as an inductor, that generates a magnetic field and a read head, such as a magneto-resistive (MR) element, that senses the magnetic field on the disks 16. The head 20 is mounted at a distal end of an actuator arm 22. An actuator, such as a voice coil motor (VCM) 24, moves the actuator arm 22 relative to the disks 16.

The HDA 12 includes a preamplifier 26 that amplifies signals received from and sent to the head 20. The preamplifier 26 generates a write current that flows through the write head of the head 20 when writing data. The write current is used to produce a magnetic field on the magnetic surfaces of the disks 16. Magnetic surfaces of the disks 16 induce low-level analog signals in the read head of the head 20 during reading of the disks 16. The preamplifier 26 amplifies the low-level analog signals and outputs amplified analog signals to a read/write channel module 28.

The HDD PCB 14 includes the read/write channel module 28, a hard disk controller (HDC) 30, a processor 32, a spindle/VCM driver module 34, volatile memory 36, nonvolatile memory 38, and an input/output (I/O) interface 40. The read/write channel module 28 synchronizes a phase of write clock signals with the data islands on the disks 16.

During write operations, the read/write channel module 28 may encode the data to increase reliability by using error-correcting codes (ECC) such as run length limited (RLL) code, Reed-Solomon code, etc. The read/write channel module 28 then transmits the encoded data to the preamplifier 26. During read operations, the read/write channel module 28 receives analog signals from the preamplifier 26. The read/write channel module 28 converts the analog signals into digital signals, which are decoded to recover the original data.

The HDC module 30 controls operation of the HDD system 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device 41, via the I/O interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the head 20 over the disks 16 during read/write operations. Servo, which is stored on the disks 16, ensures that data is written to and read from correct locations on the disks 16.

Referring now to FIG. 2, the hard disk drive system 10 stores data on magnetic media in concentric tracks, which are divided into sectors as shown in FIG. 2. When reading the data, the read head flies over the disk and senses a magnetic field stored on the disk.

Referring now to FIG. 3, a typical receiver 90 is shown. The receiver 90 includes an analog front end (AFE) module 100, an equalizer module 104, a detector module 108 and a back end module 112. A continuous-time signal is read from the disk and is processed by the AFE module 100. The AFE module 100 conditions and samples the read-back continuous time signal and outputs a discrete-time signal. The equalizer module 104 receives an output of the AFE module 100 and performs equalization to a pre-determined target. A detector module 108 receives an output of the equalizer module and decodes data. For example only, the detector module 108 may include a sequence detector such as a Viterbi detector. An output of the detector module 108 is used to drive the equalizer module 104 and adaptation of the AFE module 100. Components of the receiver 90 up to and including the detector module 108 are identified in FIG. 3 as front end section 114 and components after the detector module 108 are identified in FIG. 3 as back end section 116.

A user data portion of the output of the equalizer module 104 is further processed by the back end module 112. The back end module 112 performs more sophisticated detection and decoding for the purpose of error correction. The back end module 112 typically includes a nonlinear detector, such as a nonlinear Viterbi detector (NLV).

The AFE module 100 typically performs automatic gain control (AGC) to adjust gain. The equalizer module 104 is also typically adaptive. Adaptation in the AFE module 100 and the equalizer module 104 typically use minimum mean square error (MMSE) criteria. Typically, an amplitude of the output of the equalizer module 104 changes with a single-to-noise ratio (SNR) of the system.

Channel SNR can change from one sector to another sector due to variations in the signal or in the noise. For instance, the SNR changes with read head fly height. The SNR also changes with the amount of inter-track interference (ITI). While the AGC in the AFE module 100 and the equalizer module 104 are optimal or near optimal for the detector module 108, the output of the equalizer module 104 may not be the optimal for the back end section 116.

Referring to FIGs. 2 and 4A, for each data sector, preamble (PRE), syncmark (SM), user data (USERDATA) and post-amble (POST) fields are written on the disk. Two sectors written on two neighboring tracks identified as track n and track n+1 are shown. Typically, sectors on adjacent tracks are closely aligned. As the recording density increases, the distance between two neighboring tracks decreases. When reading track n, the read head will also pick up a signal from one or more neighboring tracks, for example track n+1. This phenomenon is called inter-track interference (ITI). The overall read-back signal is the weighted sum of track n and track n+1 as set forth below:

$$r^n = (1-\alpha)y^n + \alpha y^{n-1}$$

where $r^n$ is the read-back signal, $y^n$ is the signal from track n, $y^{n+1}$ is the signal from track n+1, and $\alpha$ is an off-track percentage factor.

Referring now to FIG. 4B, a typical receiver 120 with ITI cancellation is shown. The ITI cancellation may be applied as a post processing step. The receiver 120 includes an analog front end (AFE) module 122, an equalizer module 124, a detector module 128, an ITI cancellation module 130 and a back end module 132. A front end section 134 includes the AFE module 122, the equalizer module 124, and the detector module 128. A post processing section 136 includes the ITI cancellation module 130. A back end section 138 includes the back end module 132. The ITI cancellation module 130 treats ITI as noise introduced in the front end section 136.

SUMMARY

A receiver for a hard disk drive system includes an analog front end module configured to receive a read-back signal and to output a digital read-back signal. An equalizer module is configured to generate a data vector based on the digital read-back signal. A detector module is configured to generate a decision vector based on the data vector. A gain module is configured to generate a scalar gain vector and to generate a revised data vector based on the data vector, the decision vector and the scalar gain vector. A back end module is configured to receive the revised data vector.

In other features, the decision vector is a first decision vector and the back end module includes a soft output Viterbi module configured to receive the revised data vector and a low density parity check (LDPC) module configured to generate a second decision vector based on an output of the soft output Viterbi module.

In other features, the LDPC module is configured to output the second decision vector to the gain module. The gain module is configured to generate the scalar gain vector and to generate the revised data vector further based on the second decision vector.

In other features, the decision vector is a first decision vector, the back end module is configured to generate a second decision vector based on the revised data vector. The gain module is configured to generate the scalar gain vector and to generate the revised data vector based on the second decision vector.

A receiver for a hard disk drive system includes an analog front end module configured to sample a read-back signal and to output a digital read-back signal. An equalizer module is configured to generate a data vector based on the digital read-back signal. A detector module is configured to generate a decision vector based on the data vector. A timing loop module is in communication with the equalizer module and the detector module and is configured to adjust timing of sampling of the analog front end module. A re-timing module is configured to generate a revised data vector based on the data vector and the decision vector. The re-timing module re-samples samples in the data vector in a non-sequential time order to generate the revised data vector. A back end module is configured to receive the revised data vector.

In other features, the re-timing module is configured to resample the data vector in a reverse time order. The re-timing module is configured to resample a user data portion of the data vector in a reverse time order. The re-timing module is configured to resample a user data portion of the data vector from a middle of the user data portion to a beginning of the user data portion and from the middle of the user data portion to an end of the user data portion.

In other features, the re-timing module is configured to resample samples of the data vector using interpolation.

A receiver for a hard disk drive system includes an analog front end module configured to sample a read-back signal and to output a digital read-back signal. An equalizer module is configured to generate a data vector based on the digital read-back signal. A detector module is configured to generate a decision vector based on the data vector. A re-timing module is configured to generate a first revised data vector based on the data vector and the decision vector. The re-timing module re-samples a plurality of samples in the data vector in a non-sequential time order to generate the first revised data vector. An inter-track interference (ITI) cancellation module is configured to remove ITI from the first revised data vector and to generate a second revised data vector.

In other features, the re-timing module is configured to generate an error vector based on the data vector and the decision vector. A timing loop module is in communication with the equalizer module and the detector module and is configured to adjust timing of sampling of the analog front end module.

In other features, the re-timing module is configured to re-sample the plurality of samples of the data vector using interpolation. The re-timing module is configured to generate a second sample of the first revised data vector by interpolating a third sample of the data vector and the first sample of the revised data vector.

A receiver for a hard disk drive system includes an analog front end module configured to sample a read-back signal and to output a digital read-back signal. An equalizer module is configured to generate a data vector based on the digital read-back signal. A detector module is configured to generate a decision vector based on the data vector. An inter-track interference (ITI) cancellation module configured to remove ITI from the data vector and to generate a first revised data vector. A re-timing module configured to generate a second revised data vector based on the first revised data vector and the decision vector. The re-timing module re-samples a plurality of samples in the first revised data vector in a non-sequential time order to generate the second revised data vector.

In other features, the re-timing module is configured to resample samples in a user data portion of the data vector from a middle of the user data portion to a beginning of the user data portion and from the middle of the user data portion to an end of the user data portion.

In still other features, the re-timing module is configured to generate an error vector based on the data vector and the decision vector.

In other features, a timing loop module in communication with the equalizer module and the detector module and configured to adjust timing of sampling of the analog front end module.

In other features, the re-timing module is configured to generate a second sample of the first revised data vector by interpolating third and fourth samples of the data vector.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
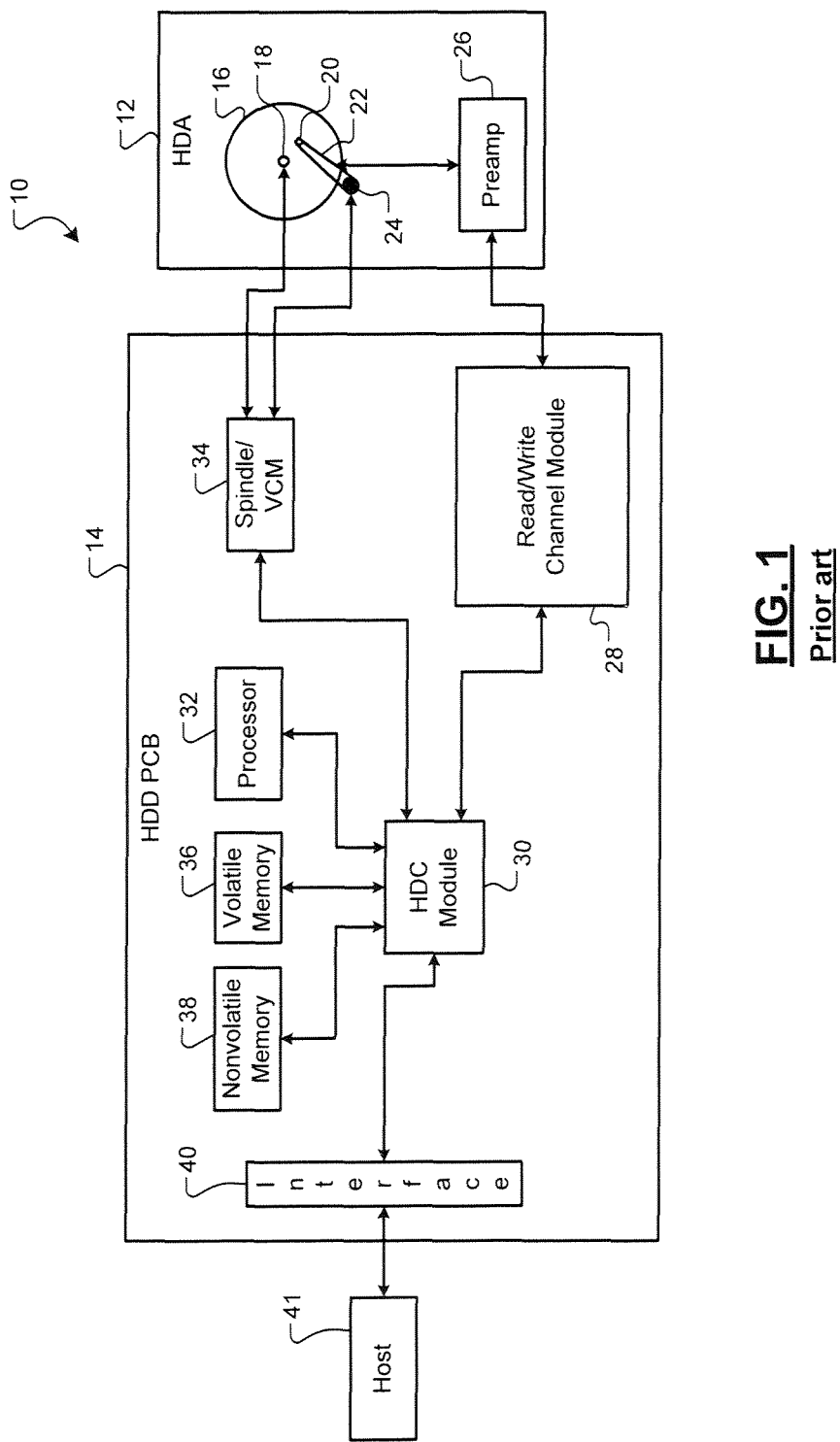
FIG. 1 is a functional block diagram of a hard disk drive according to the prior art.
Figure 2:
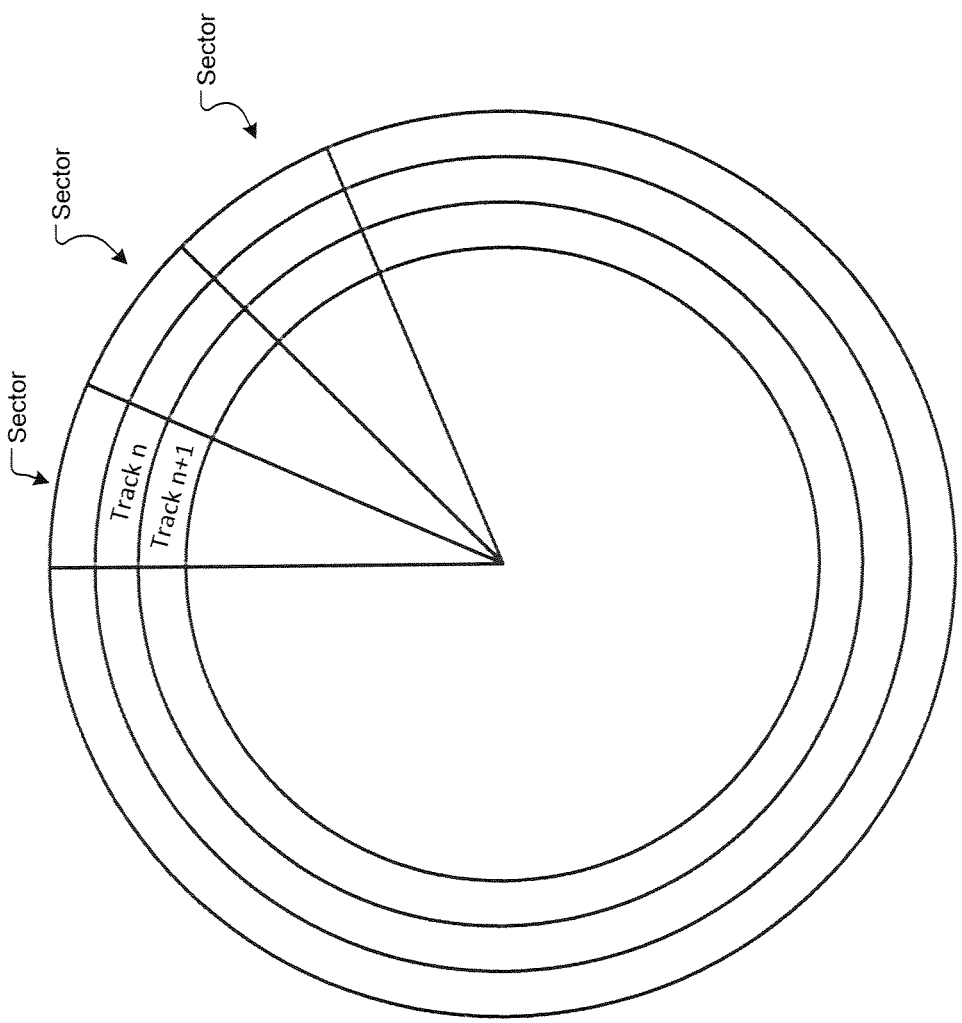
FIG. 2 illustrates tracks and sectors on a disk of a hard disk drive.
Figure 3:
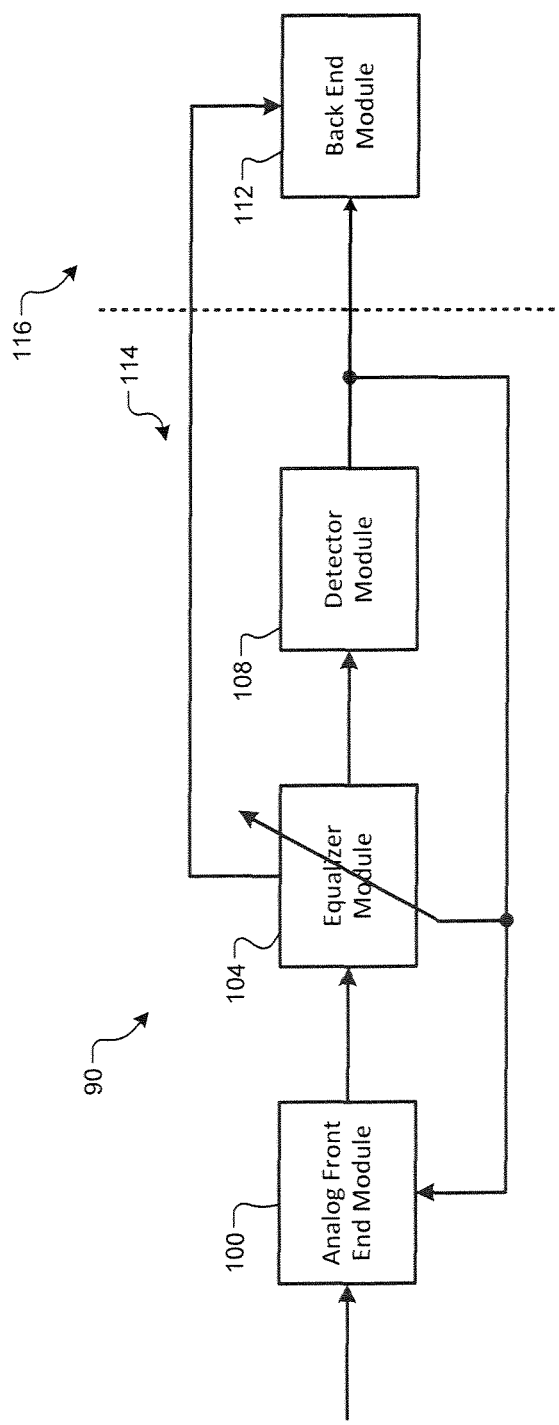
FIG. 3 is a functional block diagram of an example of a receiver in a hard disk drive according to the prior art.
Figure 4A:
FIG. 4A illustrates fields written to sectors of adjacent tracks.
Figure 4B:
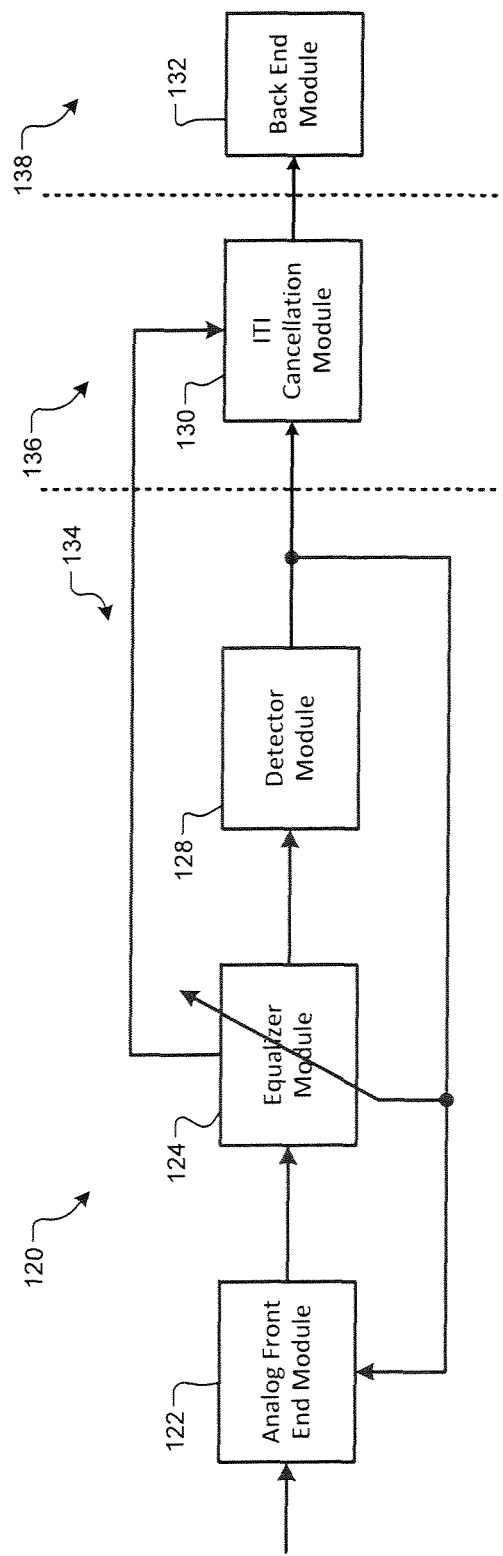
FIG. 4B is a functional block diagram of an example of a receiver with an inter-track interference (ITI) cancellation module in a hard disk drive according to the prior art.
Figure 5:
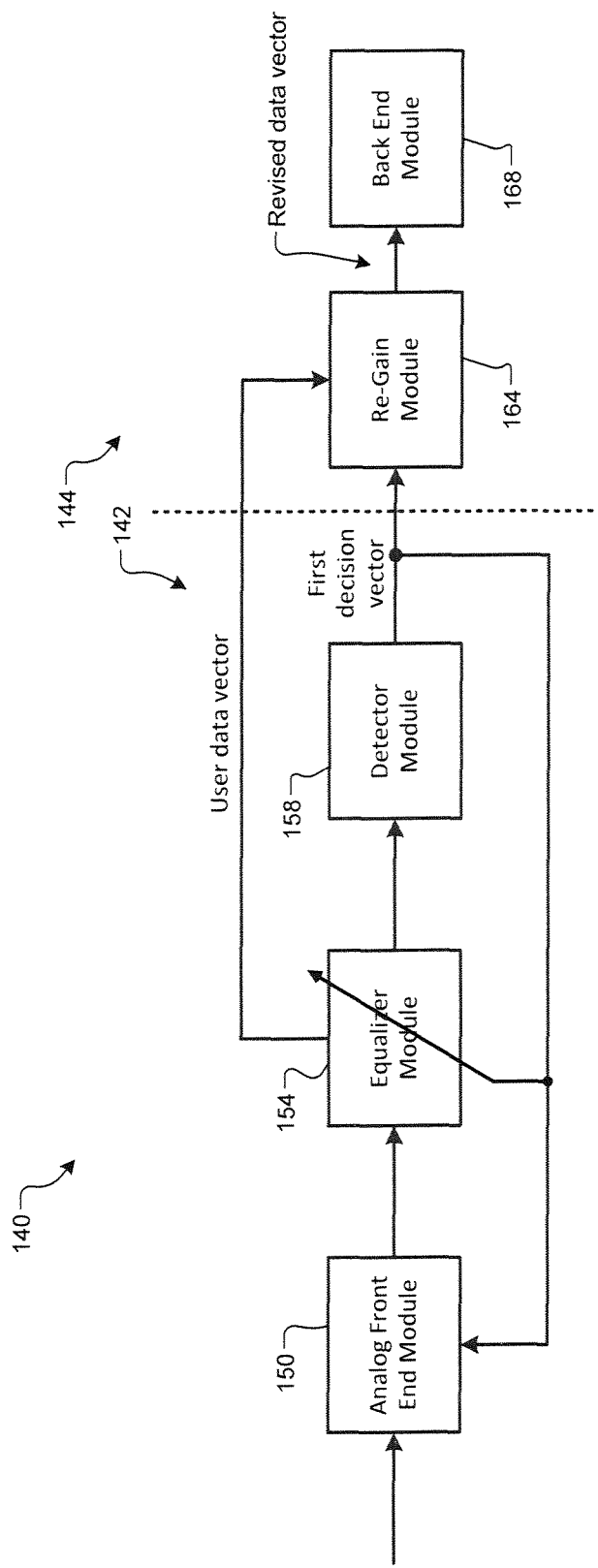
FIG. 5 is a functional block diagram of a receiver according to the present disclosure.

Referring now to FIG. 5, a receiver 140 according to the present disclosure is shown. The receiver 140 includes a front end section 142 and a back end section 144. The front end section 142 includes an analog front end (AFE) module 150, an equalizer module 154, and a detector module 158. The back end section 144 includes a re-gain module 164 and a back end module 168. The re-gain module 164 is arranged between an output of the equalizer module 154 and an input of the back end module 168. The re-gain module 164 processes the output vector from the equalizer module with the help of early decisions made by the detector module 158 in the front end section 142 or decisions from another detector (not shown) in the back end section 144.

For each sector, or sector split in the case of split sector, a data vector output by the equalizer module 154 represents the data and is denoted as $Y=[y_1, y_2, \ldots, y_L]$, where L is the length of the data vector. A first decision vector output by the detector module 158 represents the noise-free ideal output vector corresponding to the vector Y and is denoted as $\hat{Y}=[\hat{y}_1, \hat{y}_2, \ldots, \hat{y}_L]$.

The re-gain module 164 generates a revised data vector $Y'=[y'_1, y'_2, \ldots, y'_L]$, which is input to the back end module 168, where:

$$y'_i = g_i y_i, i=1,2,\ldots,L$$

A scalar gain vector $g_i$ may be calculated in several different ways that will be identified below. For example, the scalar gain vector $g_i$ may be calculated as follows:

$$g = \frac{\sum_{i=1}^{L} y_i \hat{y}_i}{\sum_{i=1}^{L} \hat{y}_i \hat{y}_i},$$

for the entire sector.

Alternately, the scalar gain vector $g_i$ may be calculated as follows:

$$g = \frac{\sum_{i=1}^{L} y_i \hat{y}_i}{\sum_{i=1}^{L} y_i y_i},$$

for the entire sector.

Figure 6:
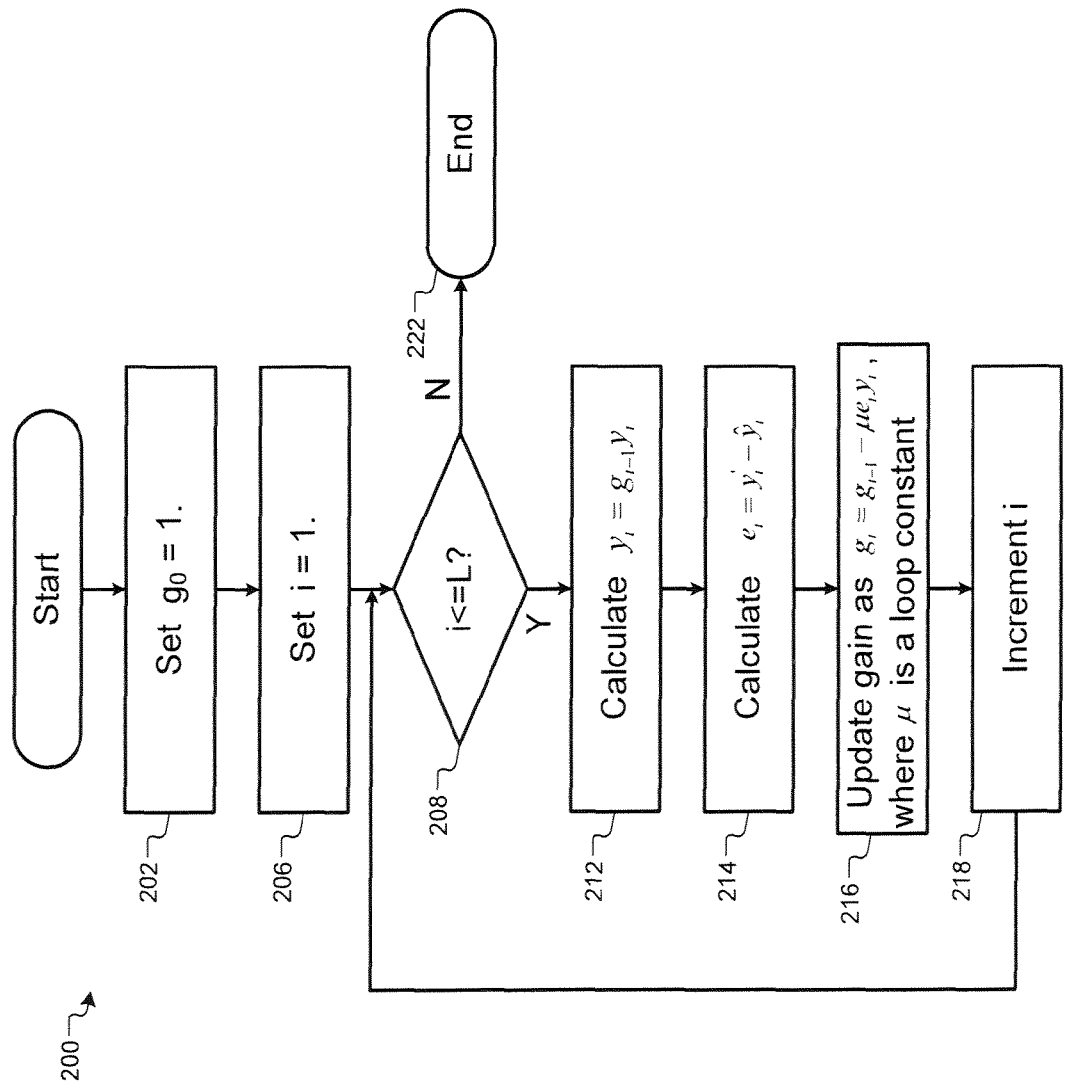
FIG. 6-9 illustrate various examples of methods for calculating a scalar gain vector according to the present disclosure.

In another example, method 200 is shown in FIG. 6 where the scalar gain vector $g_i$ may be calculated using loop adaptation using zero-forcing criteria. At 202, control sets $g_0=1$. At 206, control sets i=1. At 208, control determines whether i<=L. If 208 is true, at 212 control calculates $y'_i=g_{i-1}y_i$. At 214, control calculates $e_i=y'_i-\hat{y}_i$. At 216, control updates gain as $g_i=g_{i-1}-\mu e_i \hat{y}_i$, where μ is a loop constant. At 218, control increments i and returns to 208. When i>L, control ends at 222.

Figure 7:
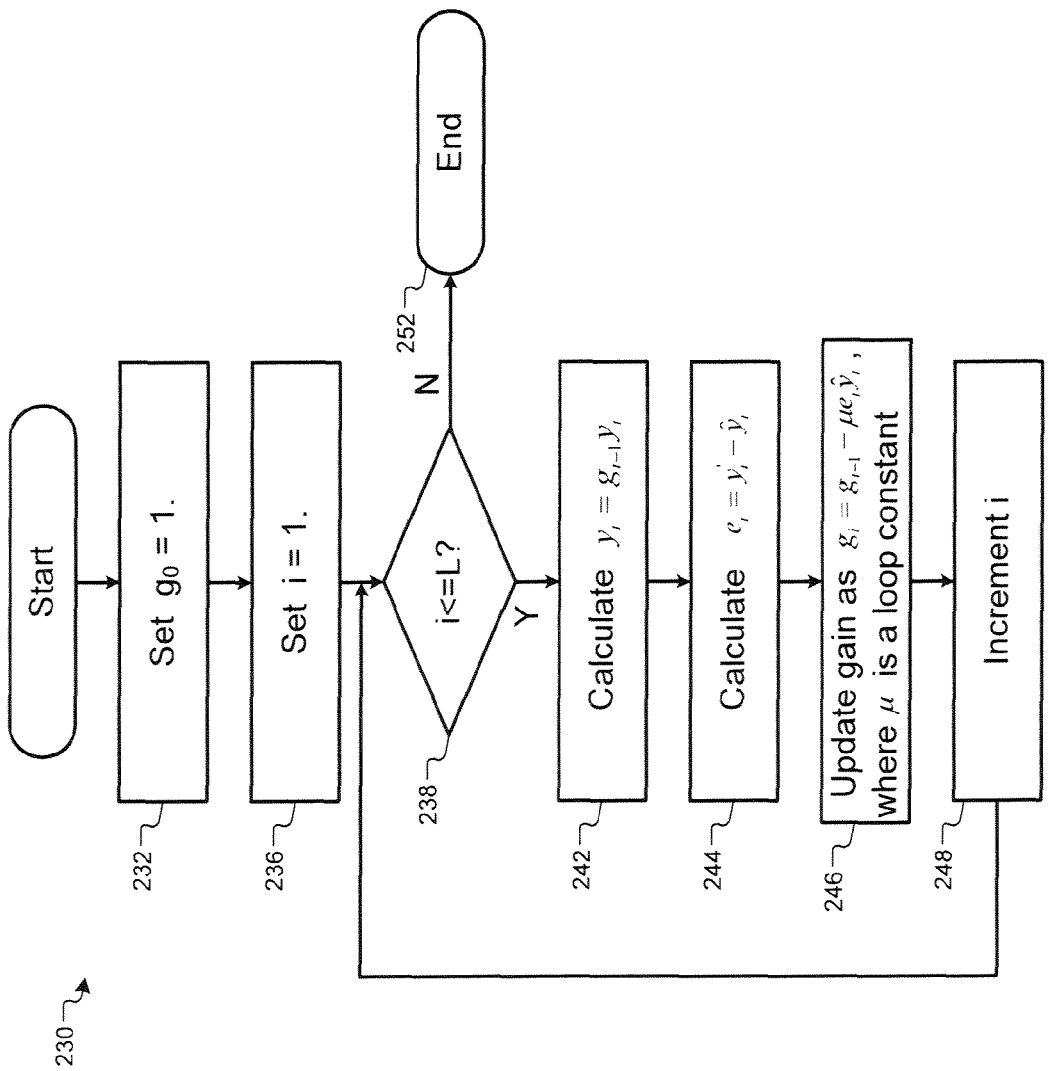

In another example, method 230 is shown in FIG. 7 where scalar gain vector $g_i$ is calculated using loop adaptation with least means squared (LMS) criteria. At 232, control sets $g_0=1$. At 236, control sets i=1. At 238, control determines whether i<=L. If 238 is true, control calculates $y'_i=g_{i-1}y_i$ at 242. At 244, control calculates $e_i=y'_i-\hat{y}_i$. At 246, control updates gain as $g_i=g_{i-1}-\mu e_i y_i$, where μ is a loop constant. At 248, control increments i and returns to 238. When i>L, control ends at 252.

Figure 8:
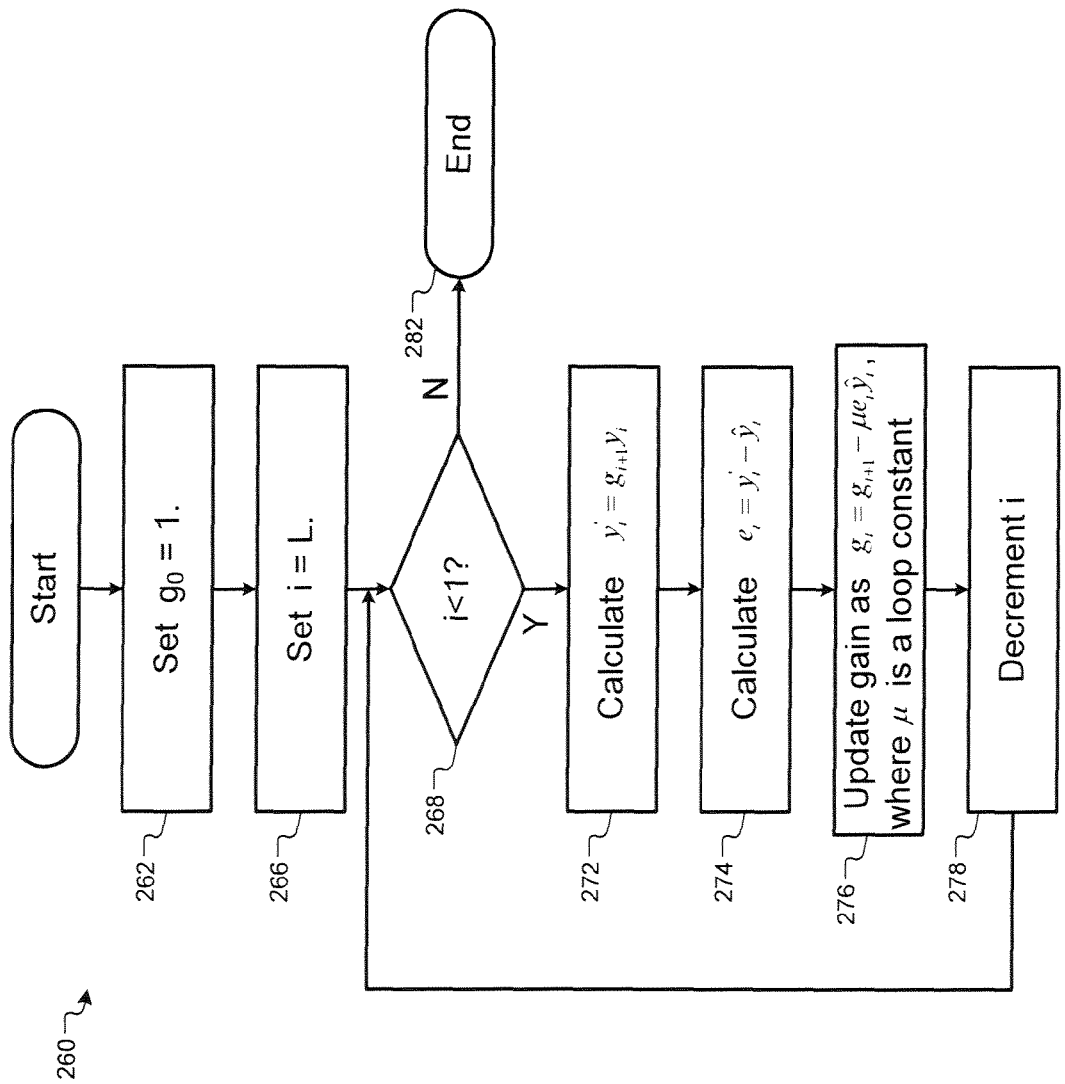

In another example, method 260 is shown in FIG. 8 where the scalar gain vector $g_i$ is calculated using loop adaptation with zero-forcing criteria, but the adaptation order is reversed as compared to FIG. 6. At 262, control sets $g_0=1$. At 266, control sets i=L. At 268, control determines whether i<1. If 268 is true, control calculates $y'_i=g_{i-1}y_i$ at 272. At 274, control calculates $e_i=y'_i-\hat{y}_i$. At 276, control updates gain as $g_i=g_{i-1}-\mu e_i \hat{y}_i$, where μ is a loop constant. At 278, control decrements and returns to 268. When i<1, control ends at 282.

Figure 9:
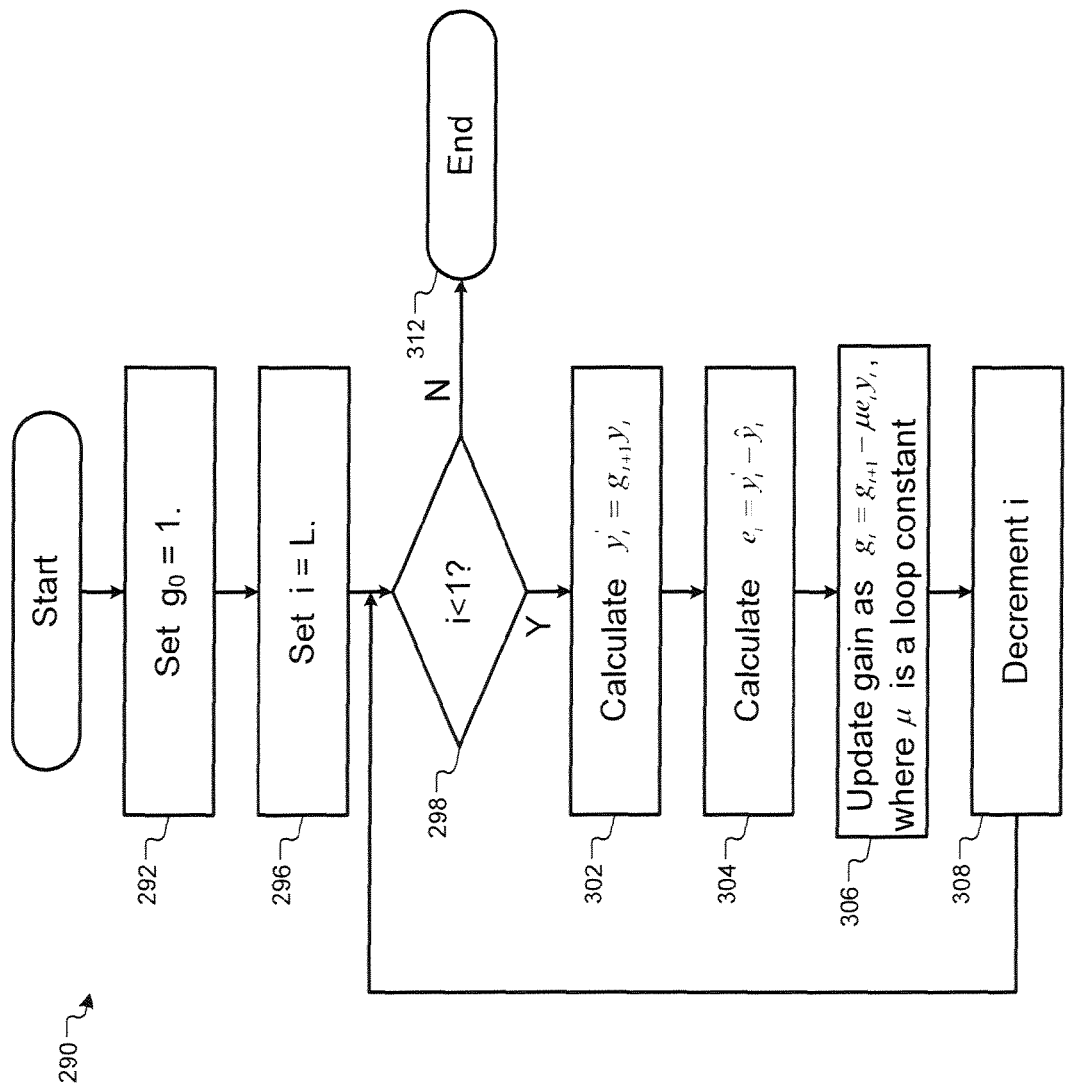

In another example, method 290 is shown in FIG. 9 where the scalar gain vector $g_i$ is calculated using loop adaptation with LMS criteria, but the adaptation order is reversed as compared to FIG. 7. At 292, control sets $g_0=1$. At 296, control sets i=L. At 298, control determines whether i<1. If 302 is true, control calculates $y'_i=g_{i-1}y_i$. At 304, control calculates $e_i=y'_i-\hat{y}_i$. At 306, control updates gain as $g_i=g_{i+1}-\mu e_i y_i$, where μ is a loop constant. At 308, control decrements i and returns to 298. When i<1, control ends at 312.

Figure 10:
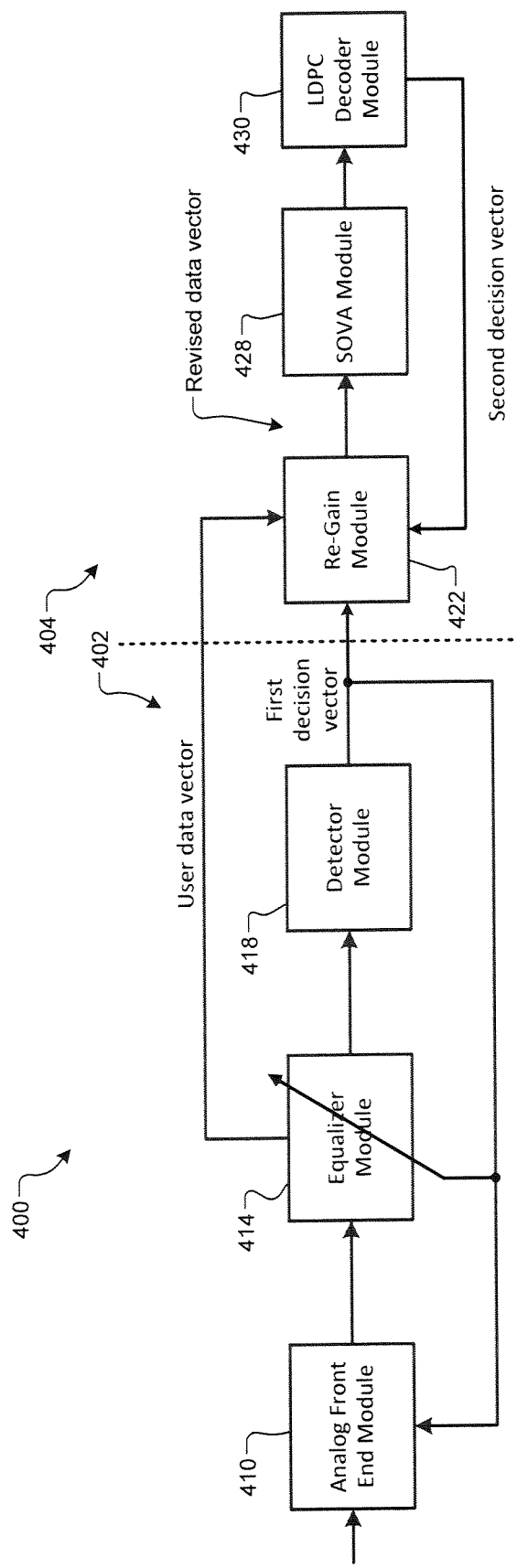
FIG. 10 is a functional block diagram of another receiver according to the present disclosure that includes an alternate re-gain module according to the present disclosure.

Referring now to FIG. 10, another receiver structure 400 is shown. The receiver 400 includes a front end section 402 and a back end section 404. The front end section 402 includes an analog front end (AFE) module 410, an equalizer module 414, and a detector module 418. The back end section 404 includes a re-gain module 422, a soft output Viterbi algorithm (SOYA) module 428 and a low density parity check (LDPC) decoder module 430.

The re-gain module 422 receives outputs of the equalizer module 414, the detector module 418 and the LDPC decoder module 430. The re-gain module 422 processes the output vector from the equalizer module 414 with the help of the first decision vector from the detector module 418 in the front end section 142 or a second decision vector from the LDPC decoder module 430 in the back end section 404.

The SOVA module 428 and the LDPC decoder module 430 may operate in an iterative fashion. The re-gain module 422 may be included in the iteration and may receive updated information from either the SOVA module 428 or the LDPC decoder module 430 as the iteration progresses.

Figure 11:
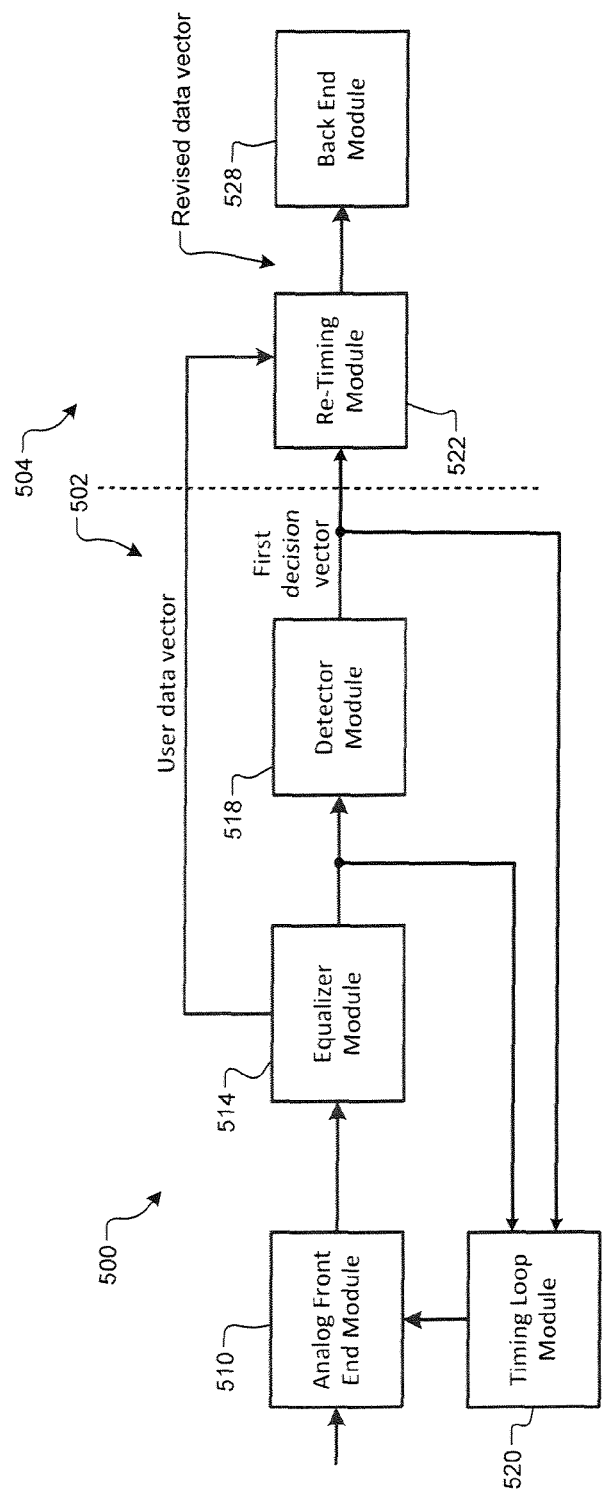
FIG. 11 is a functional block diagram of a receiver that includes a re-timing module according to the present disclosure.

Referring now to FIG. 11, a receiver 500 includes a retiming module 522 according to the present disclosure. The read-back signal from the read head is input to an AFE module 510, where it is sampled. The samples are output to an equalizer module 514, which generates a data vector. The data vector is then output to a detector module 518, which generates a first decision vector. The outputs of the equalizer module 514 and the detector module 518 are used to drive a timing loop module 520, which controls a read clock used by the AFE module 510.

The timing loop module 520 uses most recent samples to derive phase information and update the read clock. The timing loop module 520 operates in a forward manner. A re-timing module 522 according to the present disclosure further processes the data vector from the equalizer module 514 and the first decision vector from the detector module 518 to generate a revised data vector before further processing in one or more back end modules that are generally identified at 524.

A waveform generated for each field of track n also contains intertrack interference (ITI) of the same field on an adjacent track n+1. The user data on the two sectors are statistically independent. In the user data field, the ITI can be treated and filtered by the timing loop module 520 since the data is generally uncorrelated. However in the preamble and syncmark fields, the ITI cannot be filtered out by the timing loop module 520.

To illustrate this point, assume the ITI-free read-back preamble signal from track n is a sinusoid waveform as follows:

$$y^n(t) = A^n \sin(wt + \phi^n)$$

Similarly, the read-back preamble signal from track n+1 is also a sinusoid waveform as follows:

$$y^{n+1}(t) = A^{n+1} \sin(wt + \phi^{n+1})$$

Therefore, the overall read-back preamble signal is then:

$$r^n(t) = (1-\alpha)y^n(t) + \alpha y^{n+1}(t)$$
$$= (1-\alpha)A^n \sin(wt + \phi^n) + \alpha A^{n+1} \sin(wt + \phi^{n+1})$$

For simplicity, assume $A^n = A^{n+1} = A$, then:

$$r^n(t) = (1-\alpha)A\sin(wt + \phi^n) + \alpha A\sin(wt + \phi^{n+1})$$
$$= \beta A \sin(wt + \theta)$$

where $\beta$ and $\theta$ are functions of $\alpha$, $\phi^n$ and $\phi^{n+1}$.

Figure 12:
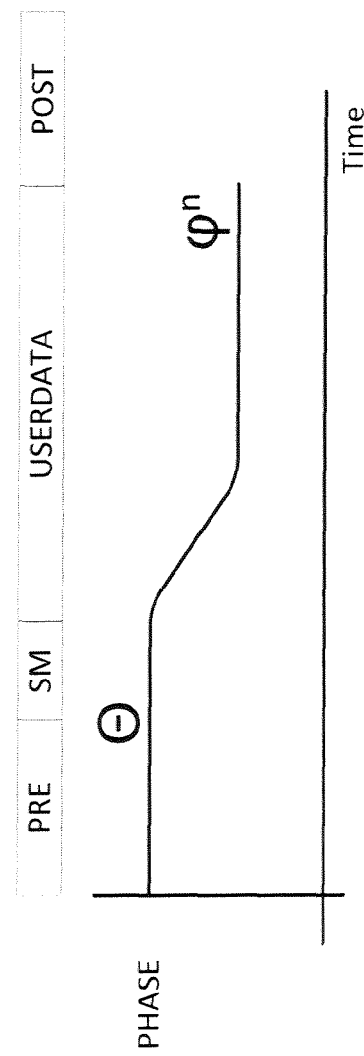
FIG. 12 illustrates a phase of a read clock during the preamble field, the sync mark field and the user data field.

Referring now to FIG. 12, for the timing loop module 520 to lock the clock onto the preamble of track n, the timing loop module 520 needs to acquire the phase $\phi^n$. However with ITI, the timing loop module 520 will acquire the phase $\theta$ during the preamble field. During the sync mark field, the timing loop also acquires the phase of the read-back sync mark waveform with ITI (e.g. phase $\theta$). When the user data field begins, the timing loop module 520 is locked to the preamble field and sync mark field with ITI (e.g. phase $\theta$). However, the timing loop module 520 should be locked to the preamble and sync mark fields without ITT (the phase $\phi^n$).

After the receiver 500 has finished detecting the user data, a data vector $[r_{u,1}{}^n, r_{u,2}{}^n, \ldots, r_{u,L}{}^n]$ corresponding to the user data is stored, where L is the length of the data vector. The re-timing loop module 522 re-samples the waveform vector into a revised data vector $[\bar{r}_{u,1}{}^n, \bar{r}_{u,2}{}^n, \ldots, \bar{r}_{u,L}{}^n]$. Re-timing and re-sampling performed by the re-timing loop module 522 runs in non-sequential time order, namely it does not process from $r_{u,1}{}^n$ to $r_{u,L}{}^n$ sequentially in a forward fashion. Re-timing and re-sampling performed by the re-timing loop module 522 can be operated in reverse from $r_{u,L}{}^n$ to $r_{u,1}{}^n$. Re-timing and re-sampling performed by the re-timing loop module 522 can also start from a middle portion of the vector $[r_{u,1}{}^n, r_{u,2}{}^n, \ldots, r_{u,L}{}^n]$, and then proceed in forward and reverse directions in parallel.

Figure 13:
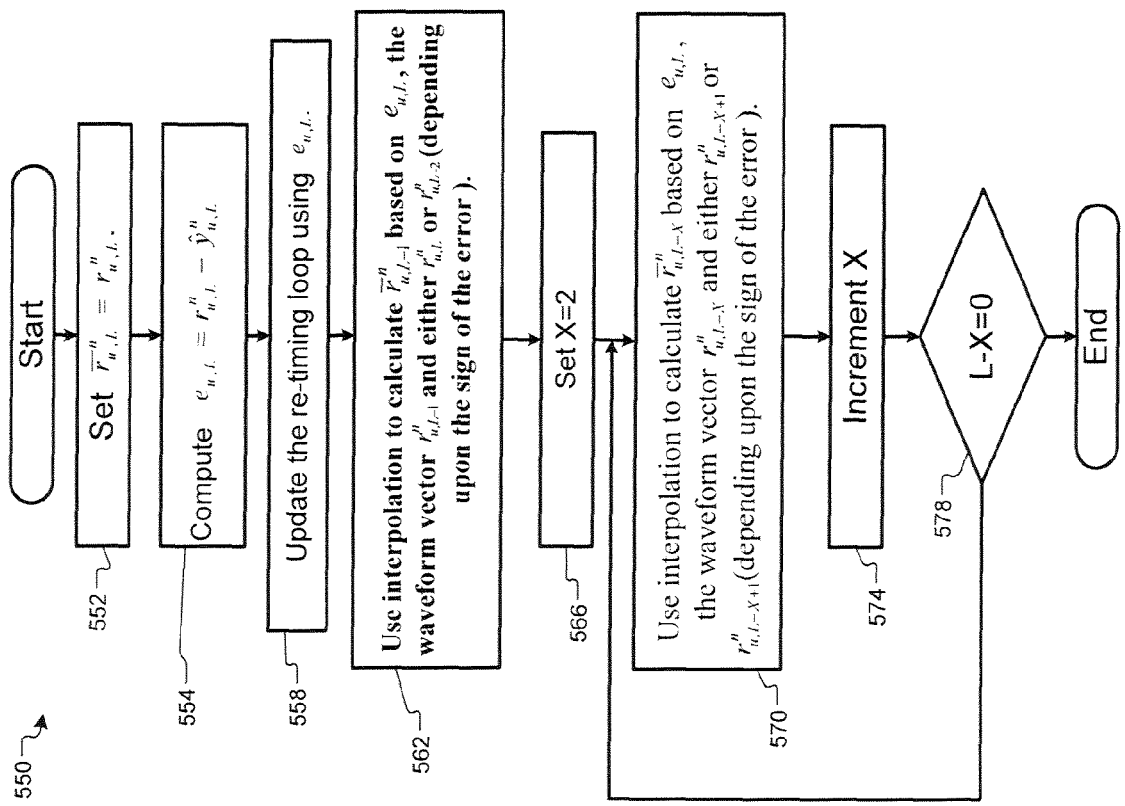
FIG. 13 illustrates a method for re-timing according to the present disclosure.

Referring now to FIG. 13, one example of a method 550 for performing the reverse re-timing and re-sampling process is illustrated. In some examples, the re-timing loop is initialized (for example, the phase accumulator is reset to zero). In 552, control sets $\bar{r}_{u,L}{}^n = r_{u,L}{}^n$. In 554, control computes $e_{u,L} = r_{u,L}{}^n - \hat{y}_{u,L}{}^n$, where $\hat{y}_{u,L}{}^n$ is the ideal value with perfect timing and may be based on the first decision vector.

In 558, the re-timing loop is updated using $e_{u,L}$. The update can be implemented using any suitable timing algorithm. For example only, the timing algorithm may be updated using the approach disclosed in Mueller and Muller, "Timing Recovery in Digital Synchronous Data Receivers", IEEE Transactions on Communications, vol. 24, no. 5, May 1976, which is incorporated herein by reference in its entirety.

In 562, interpolation is used to calculate $\bar{r}_{u,L-1}{}^n$ based on $e_{u,L}, r_{u,L-1}{}^n$ and either $r_{u,L}{}^n$ or $r_{u,L-2}{}^n$ (depending upon the sign of the error $e_{u,L}$). In 566, X=2. In 570, interpolation is used to calculate $\bar{r}_{u,L-X}{}^n$ based on $e_{u,L}, r_{u,L-X}{}^n$ and either $r_{u,L-X+1}{}^n$ or $r_{u,L-X-1}{}^n$ (depending upon the sign of the error $e_{u,L}$).

In 574, X is incremented. In 578, control determines whether L−X>0. If true, control returns to 570. If false, control ends.

The new samples after re-sampling are denoted as $\bar{r}_{u,L-2}{}^n$, $\bar{r}_{u,L-3}{}^n, \ldots, \bar{r}_{u,1}{}^n$ and the revised data vector $[\bar{r}_{u,1}{}^n, \bar{r}_{u,2}{}^n, \ldots, \bar{r}_{u,L}{}^n]$ can be used to re-detect the user data. As can be appreciated, the sampling phase from the first timing loop is more reliable during a later portion of the user data as compared to the beginning of the user data.

Figure 14B:
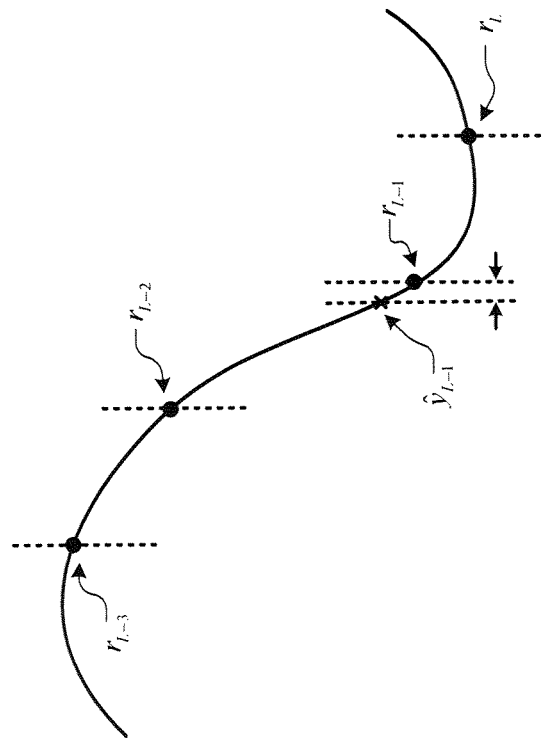
FIGS. 14A and 14B illustrate resampling using interpolation according to the present disclosure.
Figure 14A:
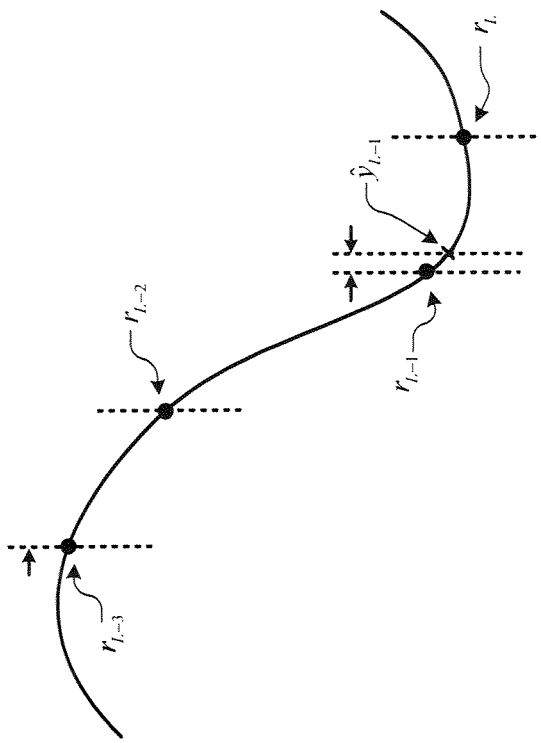

Referring now to FIGS. 14A and 14B, resampling can be implemented using any suitable timing algorithm. For example in FIG. 14A, samples in the data vector are occurring earlier than desired. Therefore, when calculating $\bar{r}_{u,L-1}{}^n$, interpolation can be performed based on $\hat{y}_{u,L-1}{}^n$, $r_{u,L-1}{}^n$ and $r_{u,L}{}^n$. Interpolation factors A and B can be based on a timing difference and can be used to interpolate between values in the waveform vector as follows:

$$\bar{r}_{u,L-1}{}^n = A * r_{u,L-1}{}^n + B * r_{u,L-2}{}^n$$

Assuming A is 0.9 and B is 0.10, the interpolation can be calculated as follows:

$$\bar{r}_{u,L-2}{}^n = 0.9 * r_{u,L-1}{}^n + 0.1 * r_{u,L}{}^n$$

In the next iteration to calculate $\bar{r}_{u,L-2}{}^n$, interpolation can be performed based on $\hat{y}_{u,L-2}{}^n$, $r_{u,L-2}{}^n$ and $r_{u,L-1}{}^n$, or alternately interpolation can be performed with the updated sample from the prior iteration (e.g., based on $\hat{y}_{u,L-2}{}^n$, $r_{u,L-2}{}^n$ and $\bar{r}_{u,L-1}{}^n$.

In the example in FIG. 14B, samples in the data vector are occurring later than desired and the polarity of the difference is opposite to that in FIG. 16A. Therefore, when calculating $\bar{r}_{u,L-1}{}^n$, interpolation can be performed based on $\hat{y}_{u,L-1}{}^n$, $r_{u,L-2}{}^n$ and $r_{u,L-1}{}^n$. For example, assuming A is 0.9 and B is 0.1, the interpolation can be calculated as follows:

$$\bar{r}_{u,L-1}{}^n = 0.9 * r_{u,L-1}{}^n + 0.1 * r_{u,L-2}{}^n$$

In the next iteration to calculate $\bar{r}_{u,L-2}{}^n$ and assuming that the difference has the same magnitude, interpolation can be performed based on $\hat{y}_{u,L-2}{}^n$, $r_{u,L-3}{}^n$ and $r_{u,L-2}{}^n$ or alternately interpolation can be performed with the updated sample from the prior iteration (e.g., based on $\hat{y}_{u,L-2}{}^n$, $r_{u,L-3}{}^n$ and $\bar{r}_{u,L-2}{}^n$). Skilled artisans will appreciate that other methods can be used to interpolate between the data values.

Figure 15:
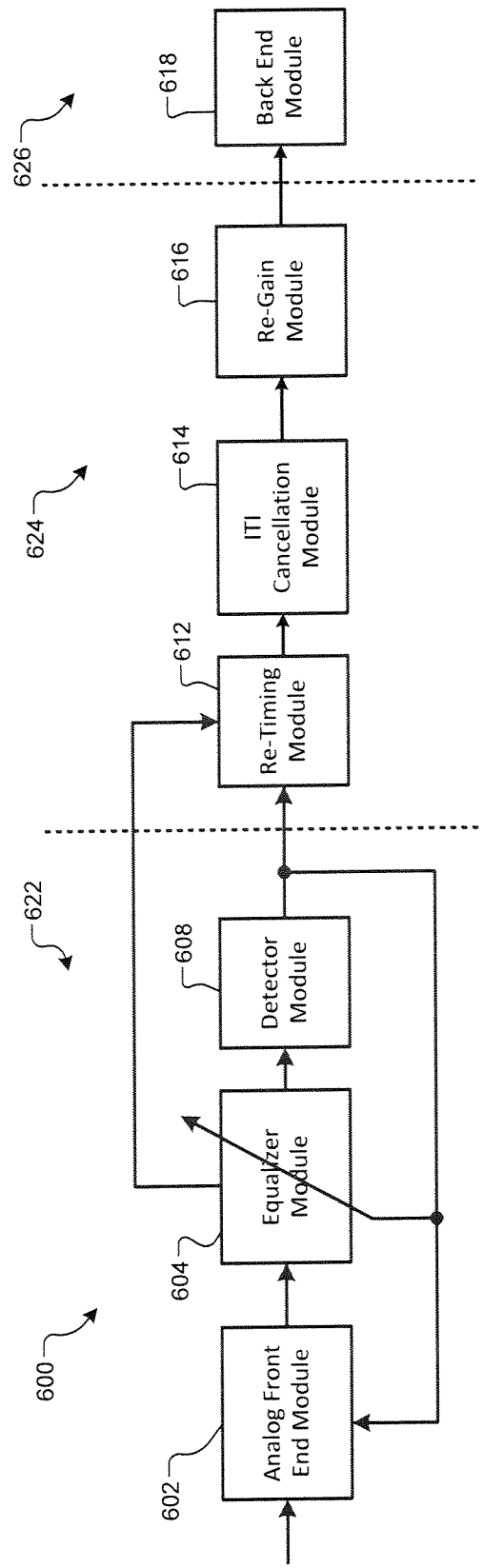
FIG. 15 is a functional block diagram of a receiver with a retiming module, an ITI cancellation module, and a re-gain module in a post processing section according to the present disclosure.

Referring now to FIG. 15, a receiver 600 includes an AFE module 602, an equalizer module 604, and a detector module 608. A re-timing module 612 receives the decision vector from the detector module 608 and the data vector from the equalizer module 604 and performs re-timing to generate a first revised data vector as described above. The first revised data vector from the retiming module 612 is input to an ITI cancellation module, which removes ITI and generates a second revised data vector. A re-gain module 616 receives the second revised data vector from the ITI cancellation module 614 and generates a third revised data vector that is output to one or more back end modules 618. The AFE module 602, the equalizer module 604 and the detector module 608 may be arranged in a front end section 622. The retiming module 612, the ITI cancellation module 614 and the re-gain module 616 may be arranged in a post processing section 624. The one or more back end processing modules 618 may be arranged in a back end section 626.

Figure 16:
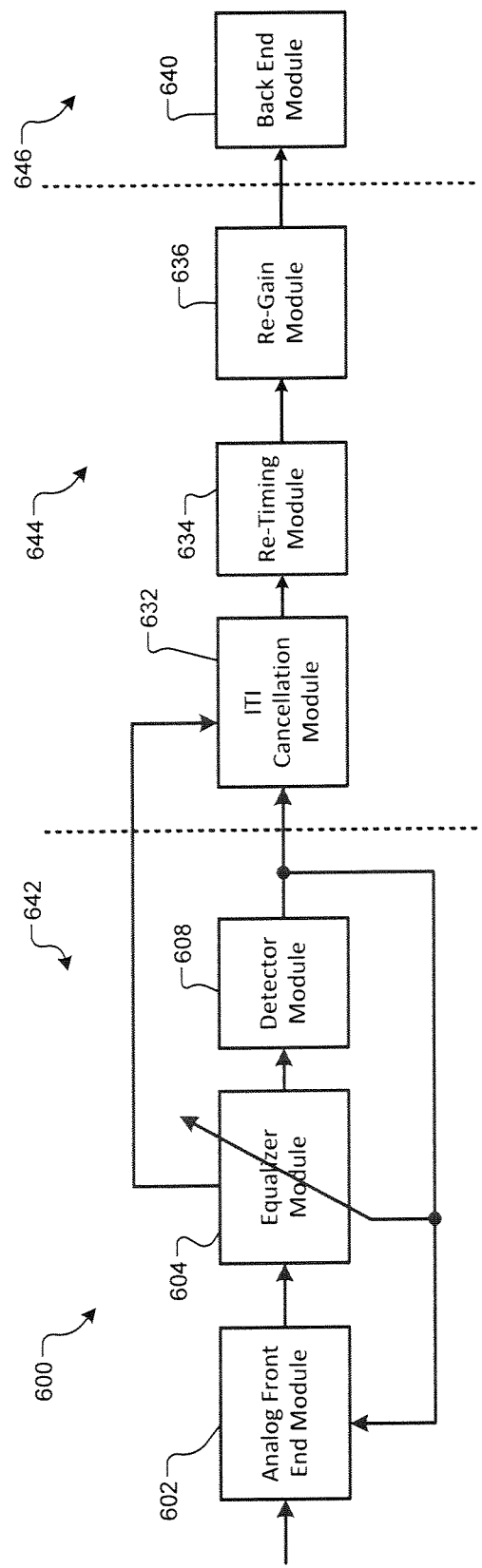
FIG. 16 is a functional block diagram of a receiver with an ITI cancellation module, a retiming module, and a re-gain module in a post processing section according to the present disclosure.

Referring now to FIG. 16, a receiver 620 includes the AFE module 602, the equalizer module 604, and the detector module 608. An ITI cancellation module 632 receives the decision vector from the detector module 608 and the data vector from the equalizer module 604 and performs ITI cancellation using any suitable approach. A second revised data vector output of the ITI cancellation module 632 is input to a re-timing module 634, which performs re-timing as described above. A re-gain module 636 receives a second revised data vector from the re-timing module 634 and generates a third revised data vector that is output to one or more back end modules 640. The AFE module 602, the equalizer module 604 and the detector module 608 may be arranged in a front end section 642. The ITI cancellation module 632, the retiming module 634, and the re-gain module 636 may be arranged in a post processing section 644. The one or more back end processing modules 640 may be arranged in a back end section 646.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A receiver for a hard disk drive system, comprising:
    an analog front end module configured to receive a read-back signal and to output a digital read-back signal;
    an equalizer module configured to generate a data vector based on the digital read-back signal; and
    a detector module configured to generate a decision vector based on the data vector; and
    a gain module configured to generate a scalar gain vector and to generate a revised data vector based on the data vector, the decision vector and the scalar gain vector; and
    a back end module configured to receive the revised data vector.

2. The receiver of claim 1, wherein the gain module is configured to calculate the scalar gain vector using loop adaptation with zero-forcing criteria.

3. The receiver of claim 1, wherein, for i=1, 2 to L, the gain module is configured to calculate the scalar gain vector $g_i$ by calculating $y'_i = g_{i-1} y_i$, $e_i = y'_i - \hat{y}_i$, and $g_i = g_{i-1} - \mu e_i \hat{y}_i$, where $\mu$ is a loop constant, L is a length of the data vector, the data vector is $Y = [y_1, y_2, \ldots, y_L]$, $g_0 = 1$, and the decision vector is $\hat{Y} = [\hat{y}_1, \hat{y}_2, \ldots, \hat{y}_L]$.

4. The receiver of claim 1, wherein the gain module is configured to calculate the scalar gain vector using loop adaptation with least means squared criteria.

5. The receiver of claim 1, wherein, for i=1, 2 to L, the gain module is configured to calculate the scalar gain vector $g_i$ by calculating $y'_i = g_{i-1} y_i$, $e_i = y'_i - \hat{y}_i$, and $g_i = g_{i-1} - \mu e_i y_i$, where $\mu$ is a loop constant, L is a length of the data vector, the data vector is $Y = [y_1, y_2, \ldots, y_L]$, $g_0 = 1$, and the decision vector is $\hat{Y} = [\hat{y}_1, \hat{y}_2, \ldots, \hat{y}_L]$.

6. The receiver of claim 1, wherein the gain module is configured to calculate the scalar gain vector using reverse loop adaptation with zero-forcing criteria.

7. The receiver of claim 1, wherein, for i=L, L−1, to 1, the gain module is configured to calculate the scalar gain vector $g_i$ by calculating $y'_i = g_{i-1} y_i$, $e_i = y'_i - \hat{y}_i$, and $g_i = g_{i-1} - \mu e_i \hat{y}_i$, where $\mu$ is a loop constant, L is a length of the data vector, the data vector is $Y = [y_1, y_2, \ldots, y_L]$, $g_0 = 1$, and the decision vector is $\hat{Y} = [\hat{y}_1, \hat{y}_2, \ldots, \hat{y}_L]$.

8. The receiver of claim 1, wherein the gain module is configured to calculate the scalar gain vector using reverse loop adaptation with least means squared criteria.

9. The receiver of claim 1, wherein, for i=L, L−1, to 1, the gain module is configured to calculate the scalar gain vector $g_i$ by calculating $y'_i = g_{i-1} y_i$, $e_i = y'_i - \hat{y}_i$, and $g_i = g_{i-1} - \mu e_i y_i$, where $\mu$ is a loop constant, L is a length of the data vector, the data vector is $Y = [y_1, y_2, \ldots, y_L]$, $g_0 = 1$, and the decision vector is $\hat{Y} = [\hat{y}_1, \hat{y}_2, \ldots, \hat{y}_L]$.

10. The receiver of claim 1, wherein the scalar gain vector $g_i$ is calculated as follows:

$$g = \frac{\sum_{i=1}^{L} y_i \hat{y}_i}{\sum_{i=1}^{L} \hat{y}_i \hat{y}_i}$$

where L is a length of the data vector, the data vector is $Y = [y_1, y_2, \ldots, y_L]$, and the decision vector is $\hat{Y} = [\hat{y}_1, \hat{y}_2, \ldots, \hat{y}_L]$.

11. The receiver of claim 1, wherein the scalar gain vector $g_i$ is calculated as follows:

$$g = \frac{\sum_{i=1}^{L} y_i \hat{y}_i}{\sum_{i=1}^{L} y_i y_i}$$

where L is a length of the data vector, the data vector is $Y = [y_1, y_2, \ldots, y_L]$, and the decision vector is $\hat{Y} = [\hat{y}_1, \hat{y}_2, \ldots, \hat{y}_L]$.

12. The receiver of claim 1, wherein the decision vector is a first decision vector and the back end module comprises:
a soft output Viterbi module configured to receive the revised data vector; and
a low density parity check (LDPC) module is configured to generate a second decision vector based on an output of the soft output Viterbi module.

13. The receiver of claim 12, wherein the LDPC module is configured to output the second decision vector to the gain module.

14. The receiver of claim 13, wherein the gain module is configured to generate the scalar gain vector and to generate the revised data vector further based on the second decision vector.

15. The receiver of claim 1, wherein
the decision vector is a first decision vector,
the back end module is configured to generate a second decision vector based on the revised data vector; and
the gain module is configured to generate the scalar gain vector and to generate the revised data vector further based on the second decision vector.

16. A method for operating a receiver for a hard disk drive system, comprising:
receiving a read-back signal and outputting a digital read-back signal;
generating a data vector based on the digital read-back signal; and
generating a decision vector based on the data vector; and
calculating a scalar gain vector and a revised data vector based on the data vector, the decision vector and the scalar gain vector.

17. The method of claim 16, wherein the scalar gain vector is calculated using loop adaptation with zero-forcing criteria.

18. The method of claim 16, wherein the scalar gain vector is calculated using loop adaptation with least means squared criteria.

19. The method of claim 16, wherein the scalar gain vector is calculated using reverse loop adaptation with zero-forcing criteria.

20. The method of claim 16, wherein the scalar gain vector is calculated using reverse loop adaptation with least means squared criteria.

\* \* \* \* \*